US012454142B2

(12) United States Patent
Lattanzi et al.

(10) Patent No.: US 12,454,142 B2
(45) Date of Patent: Oct. 28, 2025

(54) PROCESS FOR COLORING SOLID COMPACT POWDER COSMETIC CAKES USING ADJUSTABLE NOZZLE

(71) Applicant: INTERCOS S.p.A., Milan (IT)

(72) Inventors: Giuseppe Lattanzi, Limbiate MB (IT); Emilio Tentori, Barzago LC (IT); Maria Piccone, Monza MB (IT)

(73) Assignee: INTERCOS S.P.A., Milan (IT)

( * ) Notice: Subject to any disclaimer, the term of this patent is extended or adjusted under 35 U.S.C. 154(b) by 74 days.

(21) Appl. No.: 18/014,210

(22) PCT Filed: Jul. 2, 2021

(86) PCT No.: PCT/EP2021/068388
§ 371 (c)(1),
(2) Date: Jan. 3, 2023

(87) PCT Pub. No.: WO2022/008385
PCT Pub. Date: Jan. 13, 2022

(65) Prior Publication Data
US 2023/0271431 A1 Aug. 31, 2023

(30) Foreign Application Priority Data
Jul. 6, 2020 (IT) ........................ 102020000016270

(51) Int. Cl.
*B41J 11/00* (2006.01)
*B41J 3/407* (2006.01)

(52) U.S. Cl.
CPC ......... *B41J 11/00242* (2021.01); *B41J 3/407* (2013.01); *B41J 11/002* (2013.01); *B41J 3/4073* (2013.01); *B41J 11/00216* (2021.01); *B41J 11/0024* (2021.01)

(58) Field of Classification Search
CPC .... B41J 11/00242; B41J 3/407; B41J 11/002; B41J 3/4073; B41J 11/00216; B41J 11/0024
See application file for complete search history.

(56) References Cited

U.S. PATENT DOCUMENTS 6,660,332 B2 * 12/2003 Kawase ................ G02B 5/201 427/466
2011/0063390 A1 * 3/2011 Takemoto ............ B41J 11/0024 347/102
2015/0314141 A1 * 11/2015 Choi ........................ B41J 3/407 347/110
2016/0288153 A1 * 10/2016 Shinoda ............... A45D 44/005
2018/0311952 A1 * 11/2018 Cui ...................... B41J 2/04588
2019/0202199 A1 * 7/2019 Bird ..................... B41J 2/04541
2020/0015573 A1 * 1/2020 Agarwal ................. B41J 3/407

OTHER PUBLICATIONS

International Search Report (ISR) issued Sep. 20, 2021 in International (PCT) Application No. PCT/EP2021/068388.
Written Opinion of the International Searching Authority issued Sep. 20, 2021 in International (PCT) Application No. PCT/EP2021/068388.

* cited by examiner

*Primary Examiner* — Henok D Legesse
(74) *Attorney, Agent, or Firm* — Wenderoth, Lind & Ponack, L.L.P.

(57) ABSTRACT

A process for coloring a solid compact powder cosmetic cake includes dripping ink droplets of various colors and various sizes onto an upper surface of the solid compact powder cosmetic cake, and impregnating the ink droplets into the solid compact powder cosmetic cake.

3 Claims, 3 Drawing Sheets

Fig. 1
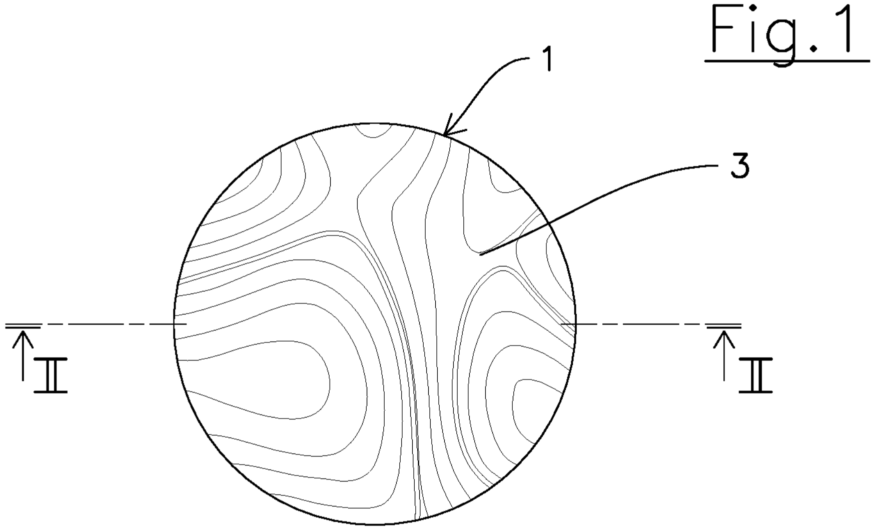
Fig. 2
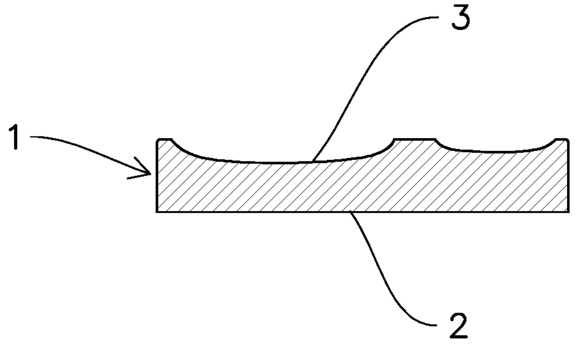
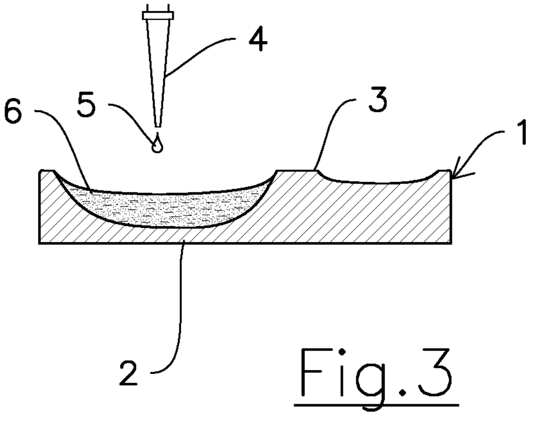
Fig. 3
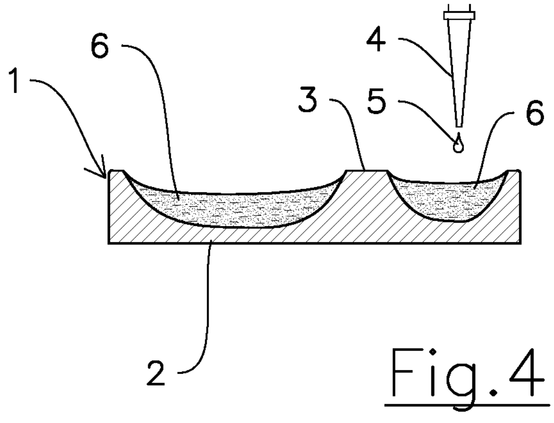
Fig. 4

PROCESS FOR COLORING SOLID COMPACT POWDER COSMETIC CAKES USING ADJUSTABLE NOZZLE

BACKGROUND OF THE INVENTION

1. Field of the Invention

The present invention relates to a process for coloring solid compact powder cosmetic products.

2. Description of the Related Art

A method is known from FR 2759941 A1 for carrying out the surface decoration of a compact solid powder cosmetic product, in which an inkjet printer carrying out ink jets of various cosmetically acceptable pigments or colors is used. The limit of this technology is the size of the pigments used, which must not be greater than 1 micron in order to prevent clogging up the printer.

SUMMARY OF THE INVENTION

In order to overcome this limit of the prior art, the present invention provides an innovative technological process, which consists in coloring compact solid powder cosmetic cakes by impregnating them with inks of various colors dripped in the form of droplets from adjustable nozzles onto the upper surface of the cake for then being impregnated therein in order to create special effects with color effects and shades.

The treatment has the function of embellishing the product. In fact, many chromatic effects with great esthetic and functional effect are obtainable, as the product is not only colored on the surface but also throughout the mass thereof. Therefore, it is possible to start from powdered cosmetic cakes of only one starting color, for example white, and then color them with any design, color, or shade of color. The decoration does not remain on the surface, but is a real coloring throughout the mass, i.e. the ink penetrates deeply into the powder cake. It is also possible to use pigments of any size without problems of clogging up the dripping devices.

BRIEF DESCRIPTION OF THE DRAWINGS

FIG. 1 shows a first top plan view of a cosmetic cake 1, by way of example of a circular shape, which has a lower surface 2 intended to rest on any support and a variously shaped upper surface 3 intended for the visual appreciation by the consumer.

FIG. 2 shows a first diametrical sectional view according to line II-II in FIG. 1 of the cosmetic cake 1.

FIG. 3 shows a second diametrical sectional view according to line II-II in FIG. 1 of the cosmetic cake 1.

FIG. 4 shows a third diametrical sectional view according to line II-II in FIG. 1 of the cosmetic cake 1.

DETAILED DESCRIPTION OF THE INVENTION

Figure 5:
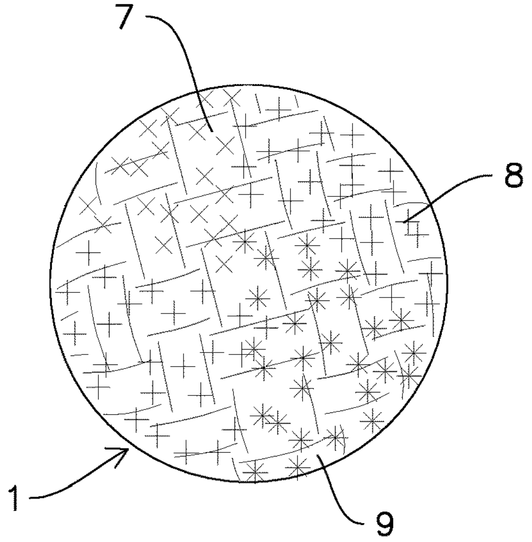
FIG. 5 shows a second top plan view of the cosmetic cake 1.

During the coloring process, the cosmetic cake 1 rests on a support and is then wet by dripping a certain number of droplets of one or more colored inks, until the material of which the cake is made is impregnated by capillary action and in depth, taking on different colors and shades.

The dosing of the inks is carried out by using adjustable dropping nozzles, diagrammatically drawn and indicated by reference numeral 4 in FIGS. 3 and 4, actuated by a control system (not shown as conventional per se) which allows a defined number of color droplets 5 to be dropped into various zones of the upper surface 3 of the cosmetic cake 1 following programmable and repeatable trajectories. Zones 6 impregnated with various colors are thus created, which esthetically characterize the cosmetic cake.

The ink amount of which each droplet is comprised, as well as the dispensing speed thereof are adjustable by means of 3 parameters:

Nozzle opening time.

Pressure inside the ink tank.

Nozzle opening section

Figure 6:
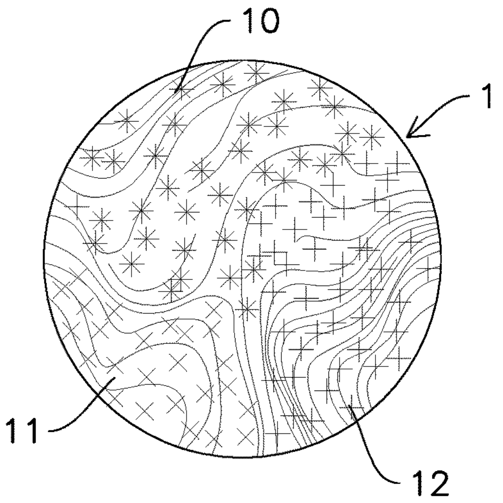
FIG. 6 shows a third top plan view of the cosmetic cake 1.
Figure 7:
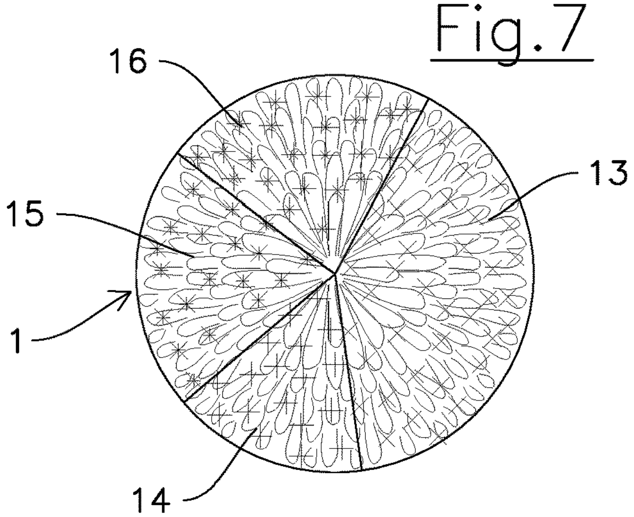
FIG. 7 shows a fourth top plan view of the cosmetic cake 1.
Figure 8:
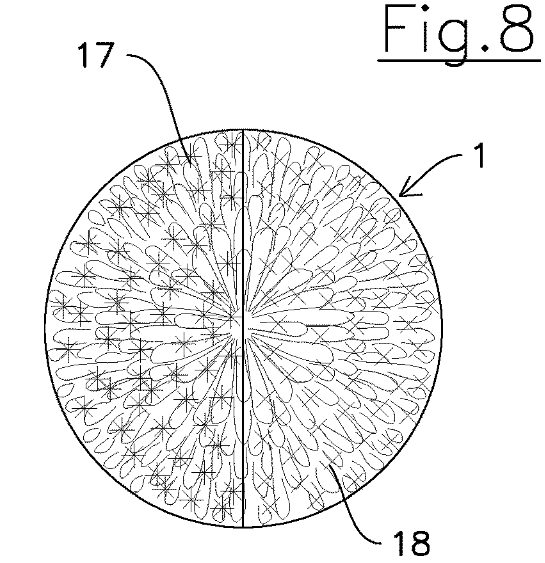
FIG. 8 shows a fifth top plan view of the cosmetic cake 1.
Figure 9:
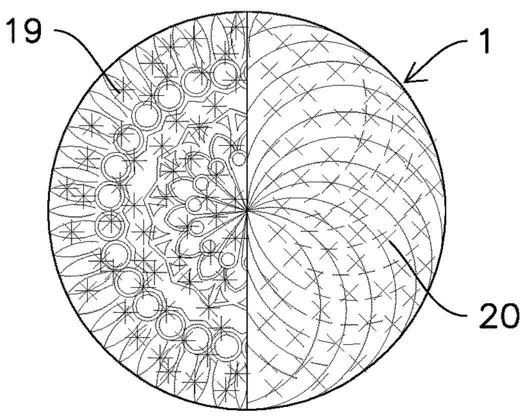
FIG. 9 shows a sixth top plan view of the cosmetic cake 1.

During the process, the nozzles and/or the cosmetic product cake to be colored can be moved on four axes (x,y,z,ϑ) by means of servo-controlled actuators, according to a path which is totally programmable in G code language (that used on CNC machine tools) and reproducible. It is thus possible to create, for example, spotted or shaded effects by superposing different colors (FIGS. 5-7, where numbers 7-16 and the marks used represent possible zones with different coloring and/or different shading), but also the impregnation of different colors of portions 17-20 of the same cake clearly divided from one another (FIGS. 8-9).

Figure 10:
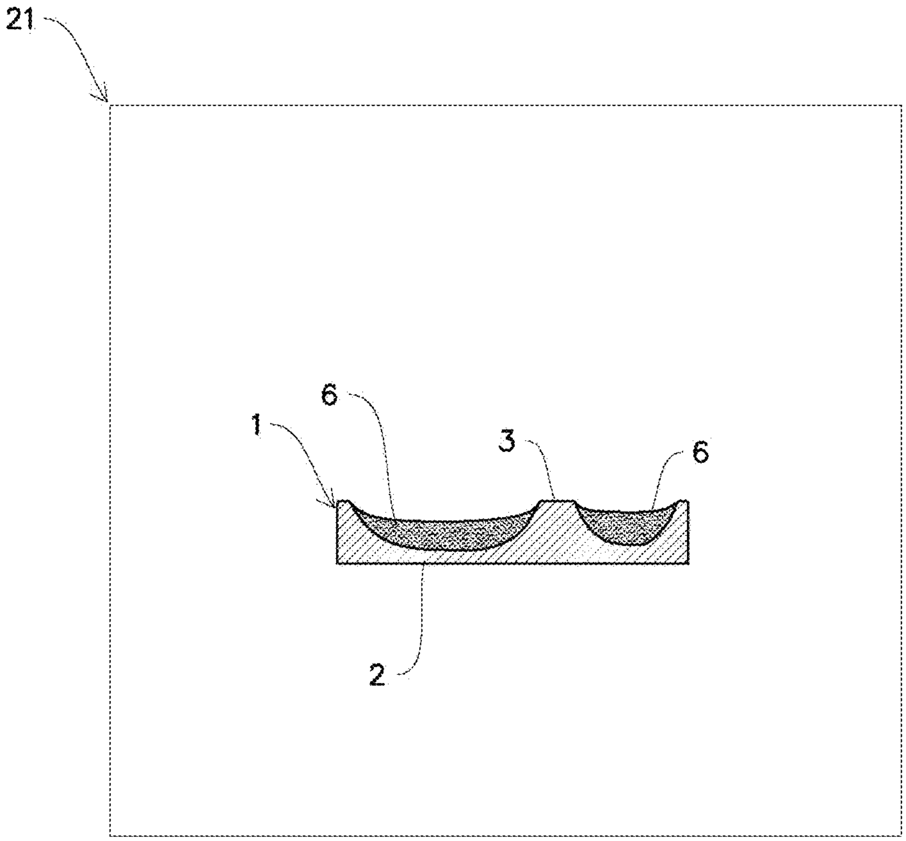
FIG. 10 shows a fourth diametrical sectional view according to line II-II in FIG. 1 of the cosmetic cake 1.

The aforesaid step of coloring the upper surface of the cosmetic cake by dripping, penetration, and impregnation of the various colors into the cake itself is followed by a step of drying the cake, which is obtained through a heat treatment carried out at a temperature between 20° C. and 90° C., preferably between 35° C. and 80° C. This heat treatment can be carried out by any suitable heating method, such as insertion into a ventilated oven 21 (as shown in FIG. 10) with controlled humidity, with air recirculation, a microwave oven, or the like, for example.

The various types of powdered cosmetic products to which the coloring process according to the present invention can be applied include the following:

Cosmetic powder obtained by a pressing process

Cosmetic powder obtained by an extrusion process.

Cosmetic powder obtained by a backing process

Cosmetic powder obtained by a pouring process

Examples of compositions of powdered cosmetic products with which the process according to the present invention can be used are indicated herein.

Cosmetic Powder Obtained by a Pressing Process

| INCI name | % RM IN Formula |
|---|---|
| TALC | 45.08 |
| MICA | 20.38 |
| TITANIUM DIOXIDE CI 77891 | 12.80 |
| OCTYLDODECYL STEAROYL STEARATE | 10.00 |

-continued

| INCI name | % RM IN Formula |
|---|---|
| IRON OXIDES CI 77491 | 1.22 |
| DIMETHICONE | 4.00 |
| BRONZE POWDER CI 77400 | 2.33 |
| SYNTHETIC FLUORPHLOGOPITE | 1.18 |
| DIISOSTEARYL MALATE | 2.00 |
| CAPRYLYL GLYCOL | 0.50 |
| ETHYLHEXYLGLYCERIN | 0.50 |
| GLASS BEADS | 0.01 |
| ZINC STEARATE | 0.01 |
| | 100 |

Cosmetic Powder Obtained by an Extrusion Process

| INCI name | % ingredients in formula |
|---|---|
| ALUMINUM POWDER CI 77000 | 18.294822 |
| SILICA | 2.032758 |
| BRONZE POWDER CI 77400 | 17.84412 |
| SILICA | 0.55188 |
| DIMETHICONE | 13.815758 |
| ISONONYL ISONONANOATE | 10.953606 |
| DIMETHICONE | 8.74702752 |
| DIMETHICONE CROSSPOLYMER | 1.66610048 |
| LAUROYL LYSINE | 6.8985 |
| DIMETHICONE/VINYL DIMETHICONE CROSSPOLYMER | 6.25100938 |
| LAURETH-4 | 0.12757162 |
| SQUALANE | 5.757466 |
| DIPHENYL DIMETHICONE | 2.86253 |
| DIMETHICONE/VINYL DIMETHICONE CROSSPOLYMER | 1.67949496 |
| SILICA | 0.0912769 |
| ISOCETETH-10 | 0.05476614 |
| DIMETHICONE | 1.223867 |
| STEARALKONIUM HECTORITE | 0.5401 |
| SILICA | 0.36792 |
| PROPYLENE CARBONATE | 0.178233 |
| DIMETHICONE | 0.04161124 |
| TRIMETHYLSILOXYSILICATE | 0.01958176 |
| | 100 |

Cosmetic Powder Obtained by a Backing Process

| INCI name | % RM IN Formula |
|---|---|
| MICA | 58.15 |
| TITANIUM DIOXIDE CI 77891 | 15.90 |
| DIMETHICONE | 8.00 |
| LAUROYL LYSINE | 6.00 |
| TITANIUM DIOXIDE CI 77891 | 4.93 |
| BORON NITRIDE | 3.00 |
| MAGNESIUM ALUMINUM SILICATE | 2.50 |
| CAPRYLYL GLYCOL | 0.70 |
| ETHYLHEXYLGLYCERIN | 0.50 |
| IRON OXIDES CI 77491 | 0.24 |
| IRON OXIDES CI 77499 | 0.08 |
| | 100 |

Cosmetic Powder Obtained by a Pouring Process

| INCI name | % ingredients in formula |
|---|---|
| CALCIUM TITANIUM BOROSILICATE | 37.43 |
| TITANIUM DIOXIDE CI 77891 | 4.18 |
| TIN OXIDE | 0.21 |
| CALCIUM TITANIUM BOROSILICATE | 38.47 |
| TITANIUM DIOXIDE CI 77891 | 3.14 |
| TIN OXIDE | 0.21 |
| CETEARYL ETHYLHEXANOATE | 7.30 |
| GLYCERIN | 3.54 |
| POTASSIUM ISOSTEAROYL/ISODECYL HYDROLYZED RICE PROTEIN | 1.58 |
| WATER (AQUA) | 0.72 |
| SQUALANE | 0.57 |
| ETHYLHEXYLGLYCERIN | 0.52 |
| CAPRYLYL GLYCOL | 0.52 |
| POLYSORBATE 20 | 0.52 |
| 1,2-HEXANEDIOL | 0.50 |
| GELLAN GUM | 0.27 |
| CALCIUM CHLORIDE | 0.16 |
| PENTAERYTHRITYL TETRA-DI-t-BUTYL HYDROXYHYDROCINNAMATE | 0.11 |
| XANTHAN GUM | 0.04 |

Examples of Inks

TABLE 1

| INGREDIENTS | % |
|---|---|
| Water | 5-99.9 |
| Alcohol | 0-24 |
| *Water soluble natural dyes/extracts | 0.1-70 |
| Preservatives | 0-1 |

*Non-limiting examples of water soluble natural dyes/extracts:

Non-Limiting Examples of Water Soluble Natural Dyes/Extracts:

Beetroot red
CI 40800/Beta-Carotene
CI 75810/Chlorophyllin-copper complex
Caramel
CI 75470/Carmine
*Spirulina platensis* Extract*
*Ipomoea batatas* Root Extract
Turmeric *longa* (Turmeric) Root Extract
*Raphanus sativus*, extract

TABLE 2

| INGREDIENTS | % |
|---|---|
| Water | 5-99.9 |
| Alcohol | 0-24 |
| **Water soluble synthetic dyes | 0.1-70 |
| Preservatives | 0-1 |

**Non-limiting examples of water soluble synthetic dyes:

CI10316/Ext. Yellow 7
CI45350/Yellow 8
CI15985/Yellow 6
CI19140/Yellow 5
CI60730/Ext. Violet 2
CI17200/Red 33
CI45410/Red 28
CI45380/Red 22
CI14700/Red 4
CI59040/Green 8

CI61570/Green 5
CI42053/Green 3
CI42090/Blue 1
CI 14700/CI 19140/CI 17200/D&C Brown n.1

TABLE 3

| INGREDIENTS | % |
|---|---|
| *Solvent | 90-99.9 |
| **Fat soluble dyes | 0.1-10 |

*Non-limiting examples of solvents:

Volatile linear silicones (Dimethicone, Hexamethyldisiloxane . . . )
Cyclic volatile silicones (Cyclomethicone, Cyclohexasiloxane, Octamethyltrisiloxane . . . )
Volatile hydrocarbons (Isododecane, Isohexadecane, 1.2 Hexanediol . . . )
Alcohols (Ethanol, Isopropyl alcohol . . . )
Glycols (1.2 Hexanediol . . . )

Non-Limiting Examples of Fat Soluble Dyes:

CI 47000/Yellow 11
CI 60725/Violet 2
CI 61565/Green 6
CI 26100/Red17

The invention claimed is:

1. A process for coloring a solid compact powder cosmetic cake, the process comprising:

applying colors on an upper surface of the solid compact powder cosmetic cake to obtain a colored cosmetic cake; and drying the colored cosmetic cake, wherein:

the applying of the colors includes dripping, by nozzles, ink droplets of various colors and various sizes on the upper surface of the solid compact powder cosmetic cake for impregnation of the ink droplets in the solid compact powder cosmetic cake;

the nozzles are adjustable with respect to: (i) an ink amount of each of the ink droplets; (ii) an ink droplet delivery speed; and (iii) a nozzle opening section; and the drying of the colored cosmetic cake includes inserting the colored cosmetic cake into an oven at a temperature between 20° C. and 90° C.

2. The process of claim 1, wherein the dripping of the ink droplets is performed with relative movement of at least one of the nozzles and the solid compact powder cosmetic cake along four axes.

3. The process of claim 1, wherein the temperature is between 35° C. and 80° C.

* * * * *